United States Patent
Houk et al.

[11] 3,880,228
[45] Apr. 29, 1975

[54] METHOD AND APPARATUS FOR CONTROLLING THE VICOSITY OF PAINT

[75] Inventors: Clifford L. Houk; Wilfred D. Kennedy, both of Findlay, Ohio

[73] Assignee: Whirlpool Corporation, Benton Harbor, Mich.

[22] Filed: Nov. 17, 1972

[21] Appl. No.: 307,644

[52] U.S. Cl. .................... 165/30; 165/65; 165/107; 239/135
[51] Int. Cl. ............................................ F25b 27/00
[58] Field of Search .......... 239/135; 165/2, 140, 65, 165/141, 107, 145, 30

[56] References Cited
UNITED STATES PATENTS
2,762,652  9/1956  Carter .............................. 165/140
3,215,192  11/1964  Sollich ............................ 165/65

*Primary Examiner*—Charles Sukalo
*Attorney, Agent, or Firm*—Hill, Gross, Simpson, Van Santen, Steadman, Chiara & Simpson

[57] ABSTRACT

Method and apparatus for controllably heating a stream of paint to achieve a predetermined viscosity at the site of application, involving a once-through system in which the paint is heated only once before delivery to the applicator means. The method involves directing a stream of paint at a relatively low mass velocity into heat exchange relationship with a flowing stream of a heat transfer liquid having a relatively high mass velocity in a heat exchange zone, and simultaneously maintaining the heat transfer liquid at a predetermined temperature by abstracting heat therefrom by means of heat transfer with a circulating coolant in the heat exchange zone.

3 Claims, 3 Drawing Figures

METHOD AND APPARATUS FOR CONTROLLING THE VICOSITY OF PAINT

BACKGROUND OF THE INVENTION

1. Field of the Invention

This invention is in the field of controlling the temperature and hence the viscosity of paint compositions by means of a continuous process in which a paint stream is continuously diverted from a constantly circulating supply of such paint and heated by means of heat exchange with a liquid in a heat exchange zone, the temperature of the heat exchange liquid being controlled by heat exchange with a coolant in the zone, and the thus heated paint is passed directly into a spray means or other applicator means.

2. Description of the Prior Art

The problem of temperature control of paint to secure proper application viscosity has been accentuated in recent times by virtue of the increase in the solids content of paints presently being used commercially. In the past, conventional painting systems generally used a paint containing about 33 percent solids and approximately 67 percent solvents. In an effort to reduce the amount of solvents in paints and thus reduce the problem of solvent disposal, paints containing a high percentage of solids, on the order of 77 percent are now being manufactured. These high solid-containing paints are very viscous at ambient temperatures. In order to achieve the proper viscosity in the paint for application purposes, it is therefore necessary to heat the paint to reduce its viscosity to fairly narrow, predetermined range. In order for the painting system to be capable of repeatedly giving the same results, the temperature to which the paint is heated must be controlled within narrow limits. In addition, it is desirable to heat the paint only once for application since repeated heating and cooling of high solids paint can cause a substantial deterioration of its properties.

There are numerous examples in the prior art of temperature control systems being applied to control the temperature of coating liquids in a spray coating apparatus. For example, U.S. Pat. No. 1,632,752 discloses a spray coating apparatus which utilizes cold water flowing through coils to reduce the temperature of the coating material. U.S. Pat. No. 2,123,604 discloses a spraying apparatus which includes a heater for heating the paint, a thermocouple to measure and control the temperature of the paint and a valve and pressure gauge to control the flow. This type of system utilizes a bypass line which recycles unused paint back to the paint reservoir. U.S. Pat. No. 2,980,339 refers to a painting system which utilizes a heat exchanger including a heater with a petroleum liquid as the heat transfer fluid and a coil through which the paint flows. This system utilizes a bypass of the heat exchanger of part of the paint in order to control the temperature and a bypass of the spray gun in order to control the pressure.

SUMMARY OF THE INVENTION

The present invention provides a method and apparatus for delivering paint at a predetermined temperature to a spray means. It involves the use of a heat exchange zone with means for continuously circulating a heat exchange medium into and through the heat exchange zone. Means are also provided for directing a relatively small stream of paint into heat exchange relationship with the circulating heat exchange medium in the heat exchange zone, the mass velocity of the paint stream being substantially smaller than the mass velocity of the circulating heat exchange medium. In order to control the temperature of the heat exchange medium heater means are provided for heating the medium and means are provided for circulating a coolant through the heat exchange zone in heat exchange relationship with the circulating heat exchange medium. Control means responsive to the temperature of the paint leaving the heat exchange zone are provided to control the amount of heat added by the heater means and the amount of coolant circulated in the heat exchange zone. The paint is thus precisely controlled in temperature without the necessity of recycling heated paint back to the relatively cool reservoir. The paint temperature is controlled precisely because the combination of the heater and the coolant provides a heat load for the heat exchange medium when the temperature of the paint rises above or below the desired temperature.

BRIEF DESCRIPTION OF THE DRAWINGS

Other objects, features and advantages of the invention will be readily apparent from the following description of certain preferred embodiments thereof, taken in conjunction with the accompanying drawings, although variations and modifications may be effected without departing from the spirit and scope of the novel concepts of the disclosure, and in which.

DESCRIPTION OF THE PREFERRED EMBODIMENTS

Figure 1:
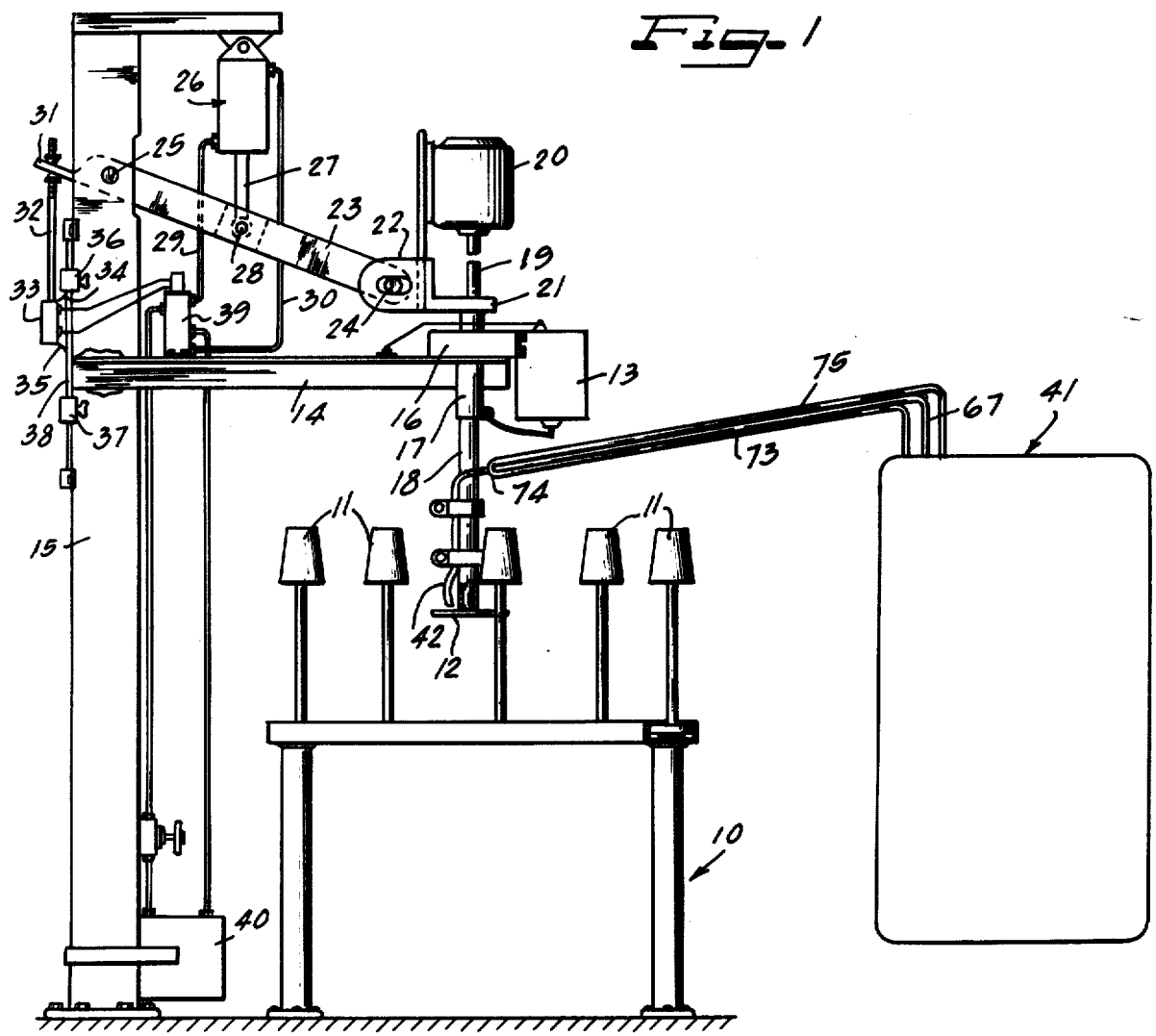
FIG. 1 is a view in elevation of an airless electrostatic spraying system employing the paint heating and feeding system of the present invention.

The system shown in FIG. 1 is an airless electrostatic spray coating system of the type used extensively commercially and described in Reissue U.S. Pat. No. 24,602. Basically, it includes a conveyor 10 which supports a plurality of work pieces 11 to which paint is to be applied. The paint is delivered into a spraying area by means of a rotating, atomizing disk 12. The disk 12 is charged to a high electrostatic potential from a direct current power supply generally indicated at numeral 13 in the drawings. The disk 12 is rotated at a substantial rotational speed in order to distribute the paint being fed to the disk as a uniformly thin film, the paint then being atomized by the electrostatic field present at the periphery of the disk 12. The disk assembly is mounted by means of a horizontally extending arm 14 secured to a vertically extending standard 15. A bracket 16 composed of insulating material carries a metallic sleeve 17 in which a hollow support rod 18 is mounted for slidable movement. Passing through the support rod 17 is a drive shaft 19 which is mounted for rotation [by suitable means (not shown)] by a motor 20.

The atomizing disk 12 is also mounted for reciprocatory movement in the vertical direction as the articles 11 are being carried along the conveyor 10. The upper end of the hollow support 18 is carried in a cross bar 21 composed of insulating material and itself is supported by means of a slotted bracket 22 on the outer end of an arm 23. The arm 23 carries a pin 24 received in the slot of the bracket 22. The opposite end of the arm 23 is pivotally engaged to the standard 15 by means of a pivot pin 25. A pneumatic piston and cylinder assembly 26 has a piston rod 27 operated by the piston and is pivotally connected to the arm 23 as indicated at reference numeral 28. Air under pressure is supplied to opposite sides of the cylinder and piston assembly 27 by means of conduits 29 and 30. As the piston reciprocates in the cylinder assembly, the arm 23 is pivoted about its pivot 25, causing vertical reciprocation of the support bar 21 and, consequently, reciprocation of the atomizing disk 12.

The length of the reciprocating stroke may be adjusted by an assembly including an extended portion 31 of the arm 23 which is engaged by a rod 32 carrying a microswitch 33. Contacts 34 and 35 on the microswitch 33 are arranged to contact dogs 36 and 37 which are adjustably positionable along a rod 38 connected to the standard 15. The microswitch 33 is connected to an electrically operated valve 39 which controls the introduction of compressed air into the conduits 29 and 30 from an air pump 40. Sequential engagement of the contacts 34 and 35 with their respective dogs thus serves to reverse the valve 39 and operate the piston and cylinder assembly.

While the assembly described thus far is a conventional airless electrostatic spray coating system, it should be understood that the method and apparatus of the present invention can be used in various types of coating systems where precise control of the temperature and hence the viscosity of the paint is important. Such systems may, for example, consist of conventional air spray systems or other types of industrial paint applicator systems.

The paint heating and flow control assembly has been illustrated generally in FIG. 1 at reference numeral 41. Heated paint from the flow control system 41 is delivered to the atomizing disk 12 through a conduit 67 having an end 42 above the disk 12 in a manner which will be hereinafter explained.

Figure 2:
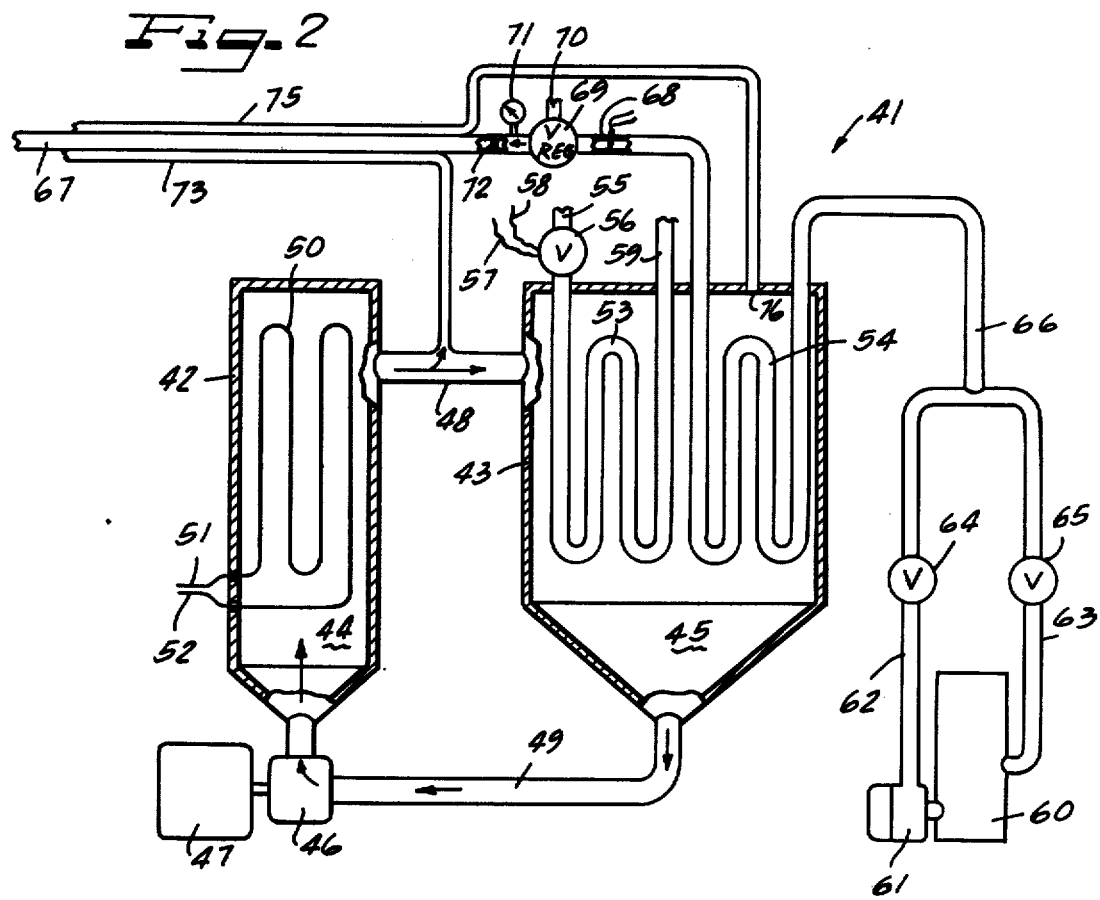
FIG. 2 is a view partly in elevation and partly in cross-section of the temperature control portion of the apparatus.

Turning now to FIG. 2 it will be seen that the flow control apparatus 41 consists of two heat exchanger compartments 42 and 43 having chambers 44 and 45, respectively, which are filled with a heat exchange medium such as oil or the like. The oil is circulated between the two chambers 44 and 45 by means of a pump 46 driven by a motor 47. The oil is circulated through the two chambers at a relatively high mass velocity, a typical pumping rate being about 75 pounds per minute. Oil is circulated from chamber 44 through a pipe 48 into the chamber 45 and from there through a pipe 49 into the pump 46. Located in the chamber 44 is a heater 50 having energizing leads 51 and 52, respectively.

Located within the chamber 45 are two tubular type heat exchangers 53 and 54. A coolant such as water enters the chamber 45 through a pipe 55 controlled by an electrically actuated valve 56 having energizing leads 57 and 58. The coolant water flows out of the chamber 45 through a pipe 59. The mass flow velocity of the coolant water is less than that of the heat exchange medium, but is substantially greater than the mass flow velocity of the paint, as will be hereinafter explained. Typically, the water circulates through the system at about 40 pounds per minute.

A paint reservoir 60 contains a supply of the high solids paint at substantially room temperature. A pump 61 is employed to keep this paint supply constantly in motion, the pump functioning to circulate paint through a pair of conduits 62 and 63 controlled by valves 64 and 65. The conduit 66 taps off a supply of the relatively cold circulating paint and delivers it to heat exchanger 54. The paint after heating in the heat exchanger is delivered to the spray system by means of a conduit 67.

A thermocouple 68 is located in the discharge conduit 67 and senses the temperature of the paint leaving the heat exchanger. A pressure regulator 69 is pneumatically controlled through a pressure line 70 to regulate the pressure of the paint leaving the chamber 45. The paint pressure in the discharge conduit 67 is measured by means of a pressure gauge 71. An orifice 72 is provided in the discharge conduit 67 so that in combination with the pressure regulator 70, the flow of paint can be controlled. Typically, the paint flow will be on the order of 0.5 to 1.3 pounds per minute.

The temperature of the paint as it leaves the heat exchange chamber 45 is further controlled by diverting a portion of the oil in pipe 48 through a tube 73 which, as shown in FIG. 1, is connected at a junction 74 with a tube 75 which communicates with the chamber 45 at an opening 76.

Figure 3:
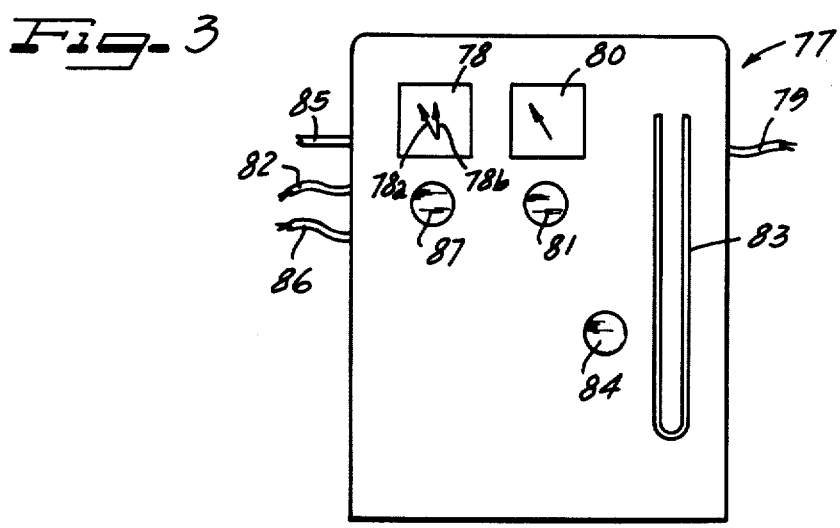
FIG. 3 is a view in elevation of the electrical control unit for the apparatus of FIG. 2.

A controller 77 shown in FIG. 3 contains the equipment necessary to provide the controls for the apparatus shown in FIG. 2. An indicating gauge 78 having pointers 78a and 78b is connected by wiring 79 to the thermocouple 68. Pointer 78a indicates the temperature of the paint leaving the heat exchanger, and pointer 78b, which can be controlled by control knob 87, indicates the desired paint temperature. Indicating gauge 80 indicates the wattage being supplied to the heater coil 50, and this wattage is under the control of a control knob 81 which is connected to the heater 50 by electrical leads 82. A U-tube manometer 83 is provided to indicate the air pressure supplied to the control of the pressure regulator 69. A control knob 84 controls the pressure supply in a fluid conduit 85 through the inlet tube 70 of the pressure regulator 69. Electrical leads 86 are connected to the leads 57 and 58 to control the operation of the electrically operated water valve 56.

In operation, oil or other heat exchanger medium is circulated between the chambers 44 and 45 and is heated by the heater 50 until the desired paint temperature is reached. Normally, a temperature of about 125°F. is employed to maintain the desired viscosity. The heater 50 is sequentially turned off and on by the control 77, in response to the temperature of the paint being sensed by the thermocouple 68 and as indicated by the deviation of pointer 78a from pointer 78b. At the same time, the water valve 56 is opened and closed by the control 77 in order to allow cooling water to flow through the heat exchanger 53 whenever the paint temperature begins to rise above the desired temperature. The heat exchange occurring between the cooling water and the circulating oil, reduces the temperature of the circulating oil and maintains the paint temperature very near the desired temperature. The flow of cooling water at a relatively high mass velocity serves as a heat load for the oil because the paint flow cannot serve as a sufficient load being only about 0.5 to 1.3 pounds per minute, as compared to the oil flow which may be on the order of 75 pounds per minute. The paint flows through the heat exchanger 54 and after heating flows through the pressure regulator 69 and the orifice 72 where the flow is controlled by the control 77. The temperature of the paint and the flow rate of the paint are adjusted to obtain a proper finish on the parts being painted. The heated oil in tubes 73 and 75 serves to insure that the paint temperature is maintained on delivery to the spray means. Thus, the paint is heated only once as it passes to the painting apparatus from the heat exchanger, but the paint is constantly circulated at ambient temperatures to and from the reservoir 60.

It should be evident that various modifications can be made to the described embodiments without departing from the scope of the present invention.

The embodiments of the invention in which an exclusive property or privilege is claimed are defined as follows:

1. An apparatus for delivering paint at a predetermined temperature to a spray means comprising:
   a reservoir for holding paint,
   means for circulating paint in a continuous loop from said reservoir back into said reservoir,
   a heat exchange vessel,
   means tapping off said loop for delivering a relatively small stream of circulating paint from said reservoir through said vessel,
   means for circulating a relatively large stream of heated heat exchange medium through said vessel and into heat exchange relationship with the paint stream passing therethrough,
   coil means in said vessel for circulating a stream of coolant substantially larger than said stream of paint through said vessel, said stream of heat exchange medium flowing against said coil means in its passage through said vessel in heat exchange relationship therewith, and
   delivery means for delivering the heated stream of paint directly from said heat exchange vessel to a spray means.

2. The apparatus of claim 1 which includes conduit means for circulating a stream of said heat exchange medium in heat exchange relationship with said delivery means.

3. The apparatus of claim 1, which includes a control means responsive to the temperature of said paint leaving said heat exchange vessel to control the amount of coolant circulated in said heat exchange vessel.

* * * * *